Jan. 12, 1937. D. SILBERMAN 2,067,734
INTERLOCKING FASTENER STRUCTURE
Filed March 21, 1932 4 Sheets-Sheet 2
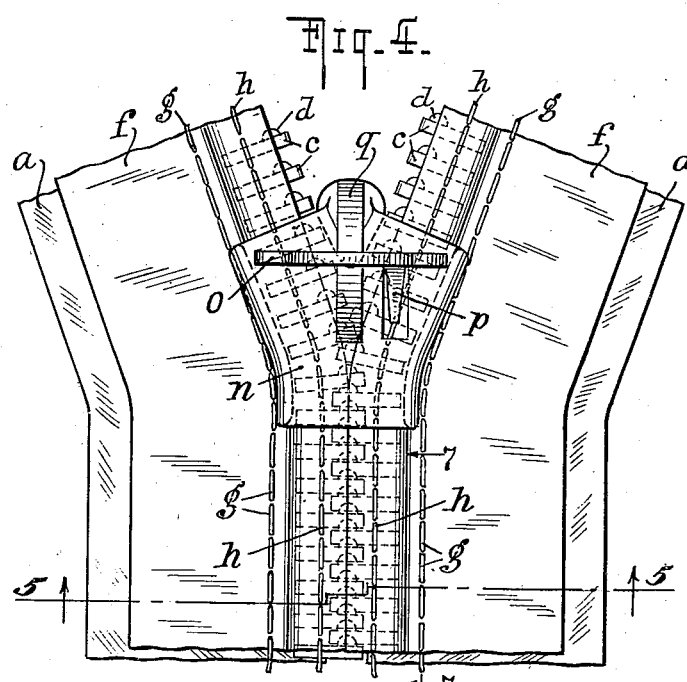
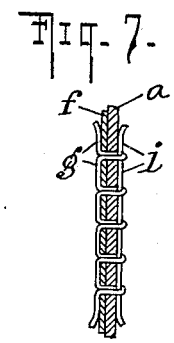
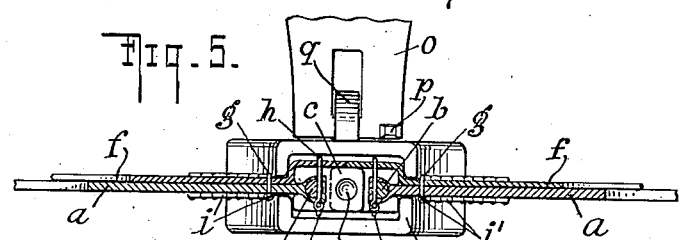
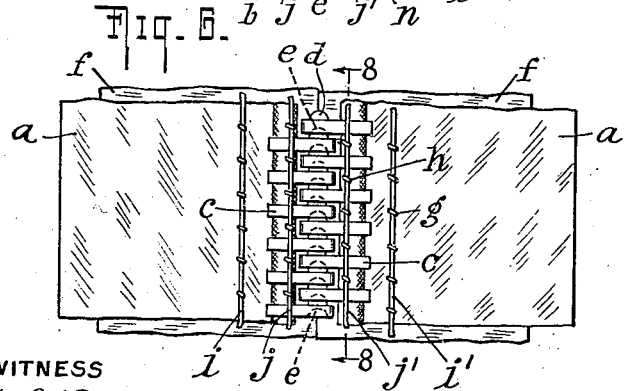
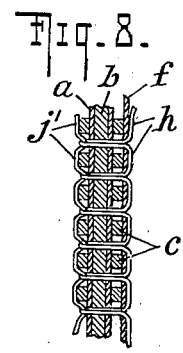
WITNESS
G. V. Rasmussen
INVENTOR
DAVID SILBERMAN
BY
ATTORNEYS

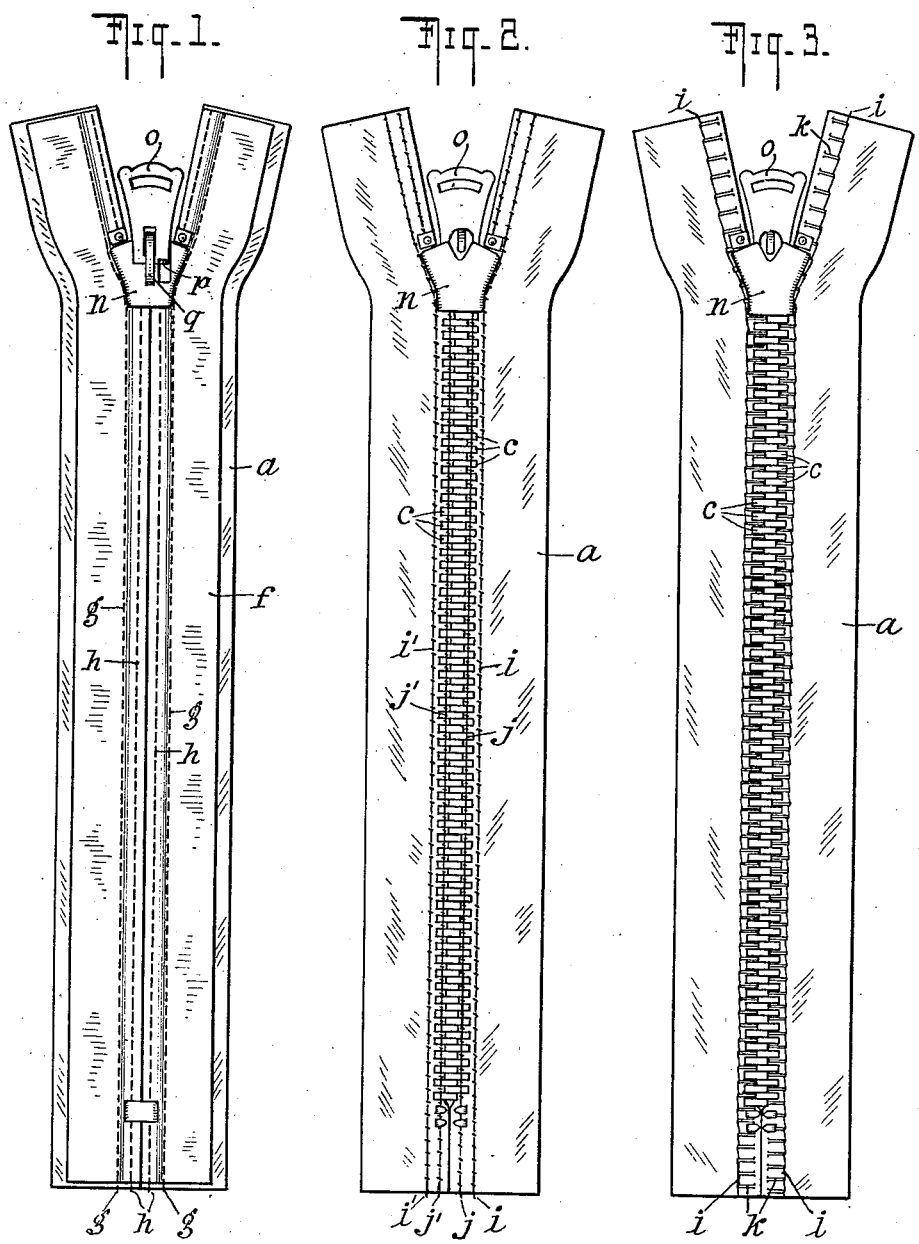

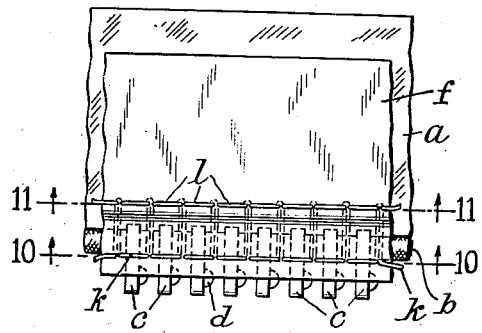
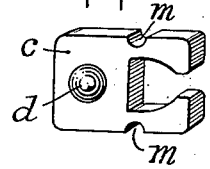
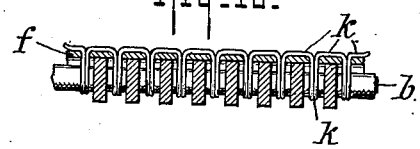
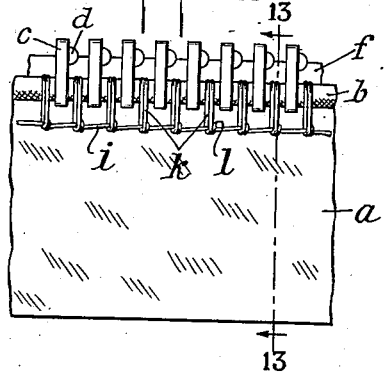
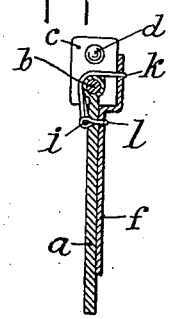

Jan. 12, 1937.                D. SILBERMAN                2,067,734
              INTERLOCKING FASTENER STRUCTURE
                  Filed March 21, 1932          4 Sheets-Sheet 4
Fig.15.            Fig.16.
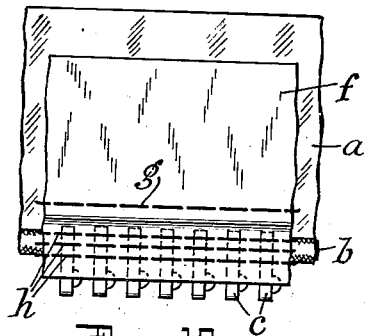 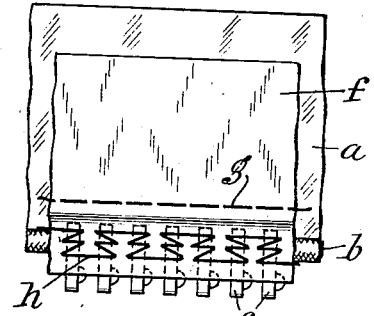
Fig.17.            Fig.18.        Fig.19.
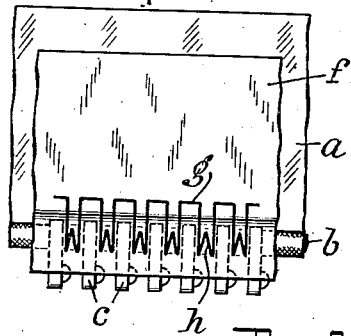 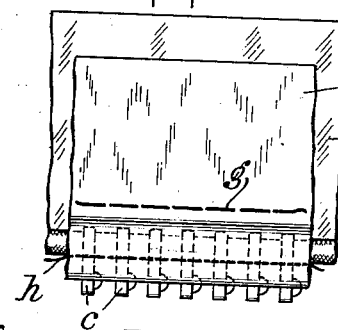 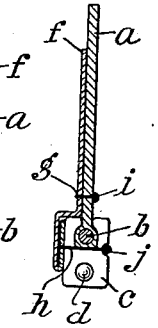
Fig.20.         Fig.21.
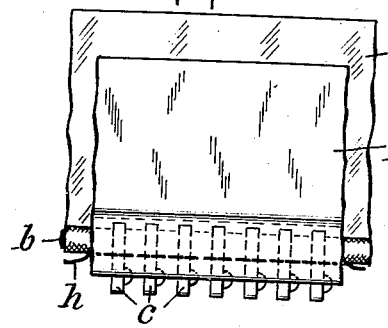
Fig.23.
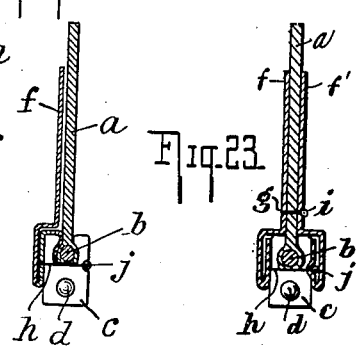
Fig.22.
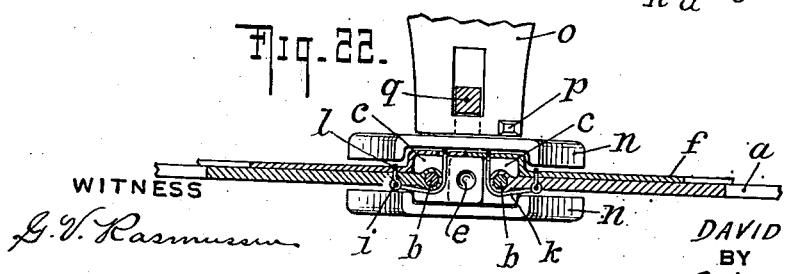
WITNESS
G. V. Rasmussen
INVENTOR
DAVID SILBERMAN
BY
Briesen Schrenk
ATTORNEYS Patented Jan. 12, 1937

2,067,734

UNITED STATES PATENT OFFICE

2,067,734

INTERLOCKING FASTENER STRUCTURE

David Silberman, New York, N. Y., assignor to Waldes Koh-I-Noor, Inc., Long Island City, N. Y., a corporation of New York Application March 21, 1932, Serial No. 600,178
In Germany January 19, 1932

42 Claims. (Cl. 24—205)

The invention relates to that type of structure which is commonly known as interlocking and automatic slide fasteners. The object of the invention is to improve such structures and in the preferred embodiment of the invention to so cover the metallic interlocking elements with fabric as to hold the covering fabric firmly against the projecting portions of the interlocking element, thereby rendering the metallic elements substantially invisible when they are in the interlocked position.

Fasteners of the type in question are generally supplied to the trade (which embodies them in the finished manufactured article in connection with which they are used) in the form of tapes having a thickened edge in association with which a multiplicity of cooperating rigid, usually metallic elements are anchored, the locking and interlocking positions of the respective metallic elements being controlled by a slide. This type of fasteners has become very popular but in many cases their appearance, their rough edges, their affectability by corrosives, etc. has prevented them from being made use of. Thus, when used in connection with under-garments, the rough edges were likely to damage the outer garments while in fine goods, such as ladies' hand bags, the unsightly character of the fasteners made their use undesirable, although mechanically their use in that connection would be of advantage. In order to overcome such defects it has heretofore been proposed to provide flaps of fabric to loosely overhang the metallic fasteners, or to imbed the fastener elements in a strip of material such as rubber. The former of these suggestions has not succeeded in meeting the requirements, while the latter is expensive and involves the employment of special intricate molding operations.

One purpose of the present invention is to overcome all these difficulties and by a simple inexpensive method of procedure not only to avoid the difficulties attendant upon the methods heretofore attempted, but to greatly enhance the beauty and desirability of this type of tape with particular reference to the articles with which they are to be incorporated.

The invention is illustrated in the accompanying drawings in which Fig. 1 is a plan view of the ordinarily visible face of the new tape; Fig. 2 is a plan view of the structure of Fig. 1 seen from below; Fig. 3 is a view similar to Fig. 2 showing a modified form of stitching; Fig. 4 is an enlarged detail of a portion of the structure of Fig. 1; Fig. 5 is a sectional view on line 5—5 of Fig. 4; Fig. 6 is an enlarged detail of a portion of the structure of Fig. 2; Fig. 7 is a detail sectional view on line 7—7 of Fig. 4; and Fig. 8 is a detail sectional view on line 8—8 of Fig. 6; Fig. 9 is a top view detail of a portion of the structure shown in Fig. 3; Fig. 10 is a section on line 10—10 of Fig. 9; Fig. 11 is a section on line 11—11 of Fig. 9; Fig. 12 is a bottom view of Fig. 9; and Fig. 13 is a section on line 13—13 of Fig. 12; Fig. 14 is a perspective view of one of the fastener elements; Figs. 15, 16, 17, 18, and 20 are top views similar to Fig. 9 showing modifications with the threads diagrammatically illustrated; Fig. 19 is a sectional view of Fig. 18; Fig. 21 is a sectional view of Fig. 20; Fig. 22 is a sectional view similar to Fig. 5 illustrating the relation between the slide, the fastener elements and the fabric sections and Fig. 23 is a sectional view similar to Fig. 19 showing a modification.

In the drawings $a$ represents the customary tape with the usual thickened edge portion $b$ (Fig. 5) and the interlocking metallic elements $c$ (Fig. 6) anchored upon or with respect to the thickened edge $b$ of the tape and each having a projection $d$ and a corresponding indentation $e$ adapted for interlocking cooperation with adjacent fastener elements extending from the opposite end of the tape. $f$ is a cover strip of fabric of a decorative character adapted to harmonize with the fabric or material of the garment or structure with which the fastener tape is to be associated. The strip $f$ shown in the drawings is typical of a grosgrain ribbon but the selection of the particular type of fabric is usually determined with particular relation to the particular article with which the fastener tape is to be used, and may, of course, be cotton, rayon, silk, satin, leather, artificial leather and in fact any sewable material.

In Figs. 1 and 2, the ribbon $f$ is associated with the fastener tape by stitches $g$ and $h$, the stitches $g$ being preferably located immediately behind the metallic fastener elements $c$. In making the stitches $h$ of Figs. 1 and 2, the needle of a sewing machine penetrates the fabric at points intermediate the attaching and interlocking ends of fastener elements and between adjacent fastener elements in the row, through or in the immediate vicinity of the thickened part $b$ of the tape $a$. The structure of such stitches is illustrated in Figs. 4 to 8. The loops of the stitches $g$ and $h$ are locked by the bobbin threads $i'$ and $j'$. These two rows of stitches $g$ and $h$ can be made simultaneously by a two-needle sewing machine suitably constructed to assure registry between the needle forming the line of stitches $h$ and those spaces of the tape between the fastener element where no metal parts lie in the path of the needle.

A different form of stitch is illustrated in Figs. 3 and 9 to 13. In that case the thread loops of the line of stitching $K$ extend over and around the edge of each tape between the metallic fastener elements, these loops as well as the loops of the line of stitches $l$ being interlocked by the single bobbin thread $i$. By this I do not mean to indicate that the transverse stitches or loops of the line of stitching shown in Figs. 3 and 9 to 13 might not also penetrate the tape or base fabric in the same manner as do the transverse stitches in the line of stitching h illustrated in Fig. 5 whenever this is found desirable and in that event a section would be such as indicated in Fig. 13 except that the loops would extend through the reinforced section of the tape or base portion instead of extending over and around such section in the manner shown. In the case of the tape of Figs. 1 and 2, the metallic elements may be provided with a groove on their under surfaces and/or upper surfaces (such as m; see Fig. 14), so that the stitches h may come to lie under or in the same plane as that occupied by the decorative cover strip f and/or the bobbin thread j will not project above the plane of the fastener element. It is, of course, understood that instead of a single line of stitches h several lines of such stitching may be employed (as indicated in Fig. 15) or that the line of stitches, instead of running straightway along the length of the tape, may be zigzag stitches which cross each fastener element back and forth several times before proceeding to the next fastener element as indicated in Fig. 16. It is also possible to combine the lines of stitching g and h by having the thread take a course such as indicated in Fig. 17, wherein the course of the stitches makes a zigzag stitch between the metal teeth and then goes around the metal teeth and then back to form another zigzag stitch between the next two teeth and so on. It is thus apparent that there are many forms of sewing which may be utilized to accomplish the purposes of my invention and that whatever type of sewing may be employed as the attaching means will include transverse stitches which may penetrate the cover and base portions of the fastener structure at points intermediate the attaching and interlocking ends of the fastener elements and between adjacent fastener elements, as illustrated in Figs. 1, 2 and 4 to 8, or penetrate the cover portion only within that zone so that parts thereof extend over and around the edge of the base portion from which the elements project, as shown in Figs. 3, 9 to 12 and 22, or adjacent the edge of the base portion and around the fastener elements, as shown in Figs. 18 to 21 and 23, or such stitching may include transverse stitches which penetrate both the base and cover portions and other transverse stitches which penetrate the cover portion only, as indicated in the forms shown in Figs. 15, 16 and 17. In the view shown in Fig. 1 the stitches h are visible, but if it is desired to conceal them entirely the decorative cover f can be stitched to the tape through the rear of f and the unstitched portion of f can then be folded back, over-lying the stitches as indicated in Figs. 18 and 19. As a rule the use of a fabric strip f to cover the top portions of the metallic fastener elements is sufficient, but a covering strip can, of course, be also applied to the underside of the tape when desired as indicated in Fig. 23, to cover that face of the metal fasteners just as securely as the front face is covered by f. The attachment of the strip f to a tape a may also be accomplished during the initial assembly of the metallic fasteners with the tape edge. In such a case as indicated in Figs. 20 and 21 the strip f can be clamped in place by the clamping portions of the metal fasteners, the free portion of the fabric f being then folded back over the metallic elements and stitched down by any of the methods of stitching thus far described or when an underside fabric strip such as shown at f' in Fig. 23 is additionally used in this type of construction the strip f' may also be clamped in place by the clamping portions of the metal fasteners, be folded back over the metallic elements and stitched down by the same stitches which hold the fabric f in place or by adjacent stitches if such procedure be preferred. The fabric strip f preferably over-lies the metallic elements to such an extent that when the elements are interlocked the edges of the strips f will crowd against each other and thereby completely conceal the fasteners. This becomes possible only however when the tendency of the edges of the fabric f to gap is counteracted by placing the stitches h or k in the immediate vicinity of the free ends of the fastener elements and between the fastener elements in the region of the edge of the fabric which supports the fastener elements. In the case of each of the forms of structure illustrated, the fastener elements form an extension of the base fabric portion projecting from the edge of the fabric base in approximately the plane of the base fabric while the fabric cover has a body section which extends in a plane parallel to that of the fabric base so that the two fabric portions form a pocket from which the interlocking ends of the fastener elements project, the fabric cover portion being secured in the position in which it overlies the fastener elements by appropriate means illustrated as stitches for holding the fabric cover portion down against the upper surfaces of the fastener elements.

In connection with the new covered tape, it is advisable to alter the slide member n so that the effective work of this slide will be concentrated on the lower and inner parts of the slide and the engagement between the lower and inner portions of the slide and the metallic fastener elements while the upper portions of the slide will be so configured as to reduce to a minimum friction between the covering strip f and the slide member. The new arrangement and relative effect of portions of the slide member are shown in Fig. 22. It is also desirable in connection with the new covered fastener strips to provide a special means for locking the slide with respect to the tape. This is accomplished by moving the handle o of the slide down upon the slide from the position shown in Fig. 4 whereupon the projection p carried by the handle o will be pressed against the fabric f, the position of the handle being maintained by the yoke q of the slide.

It will be observed that the idea of utilizing the space between adjacent rigid fastener elements as a lodgment for threads of a sewing machine makes it possible to accomplish the object of the invention. Heretofore no one contemplated positioning threads of a sewing machine in that space but I have found it perfectly feasible to do so. As a result I found that even without the covering strip f the presence of sewing machine stitches between adjacent fastener elements may in itself operate as an agent which contributes to the proper support and position of the fastener elements. If there is no covering strip f at all, but threads such as shown in Fig. 3 for example occupy the spaces between the rigid elements, the rigid elements may thereby, after being angularly displaced with reference to each other by the action of the slide, be aided in returning to their proper parallel positions. The presence of these threads also rigidifies the material between adjacent fastener elements, acts as a stop between adjacent elements, and prevents side play. When the cover strip $f$ is in place, the stitches which hold its edge portion down upon the rigid elements prevent gaping and the fabric $f$ completely conceals the rigid fasteners so that what is observable when the new device is embodied in a corset or hand-bag or the like, is only the fabric of the garment or the bag and the fabric $f$ which matches it. The beauty of the product is greatly enhanced and the mechanical reliability of the structure is improved. Inasmuch as the metallic fasteners are completely concealed, it is not necessary to make them of specially selected material or metal, but the most inexpensive metal or material can be used, provided it is sufficiently strong to do the work. Thus brass becomes available where heretofore in finer work it was necessary to use a special alloy or plating.

The invention as indicated by the numerous illustrated variants (Figs. 1, 3, 15–18 and 20) is capable of being embodied in the completed structure in a large variety of ways without departing from the scope of the invention as defined in the accompanying claims.

I claim:

1. The combination of a stringer, a series of rigid fastener elements attached thereto extending outwardly from an edge thereof and adapted for interlocking engagement with corresponding elements projecting from the edge of a second stringer or support and sewing extending as a whole longitudinally of the stringer and including stitches extending in a transverse direction with reference to the stringer at points intermediate the attaching and interlocking ends of the fastener elements and between adjacent fastener elements in the row, said transverse stitches providing rigidifying means for the fabric between the adjacent fastener elements and also lateral abutment means for limiting side play of the individual fastener elements.

2. A structure such as set forth in claim 1 in which portions at least of the transverse stitches are situated in the immediate vicinity of that edge of the stringer from which the fastener elements project.

3. In a fastener structure of the slide-operated type, the combination of a base portion, a row of fastener elements attached thereto and projecting from an edge thereof, and a cover portion adjacently overlying said fastener elements, means for maintaining the relative position of the cover portion, the fastener elements and base portion, and for holding the cover portion against the upper portion of said fastener elements, said means including stitches penetrating the cover portion intermediate the attaching and interlocking ends of the fastener elements and extending transversely of the individual fastener elements of the row and between adjacent fastener elements in the row.

4. A fastener structure such as set forth in claim 3 in which the edge of the cover portion extends further towards the free ends of the fastener elements than does the edge of the base portion, and all of the stitches which penetrate the cover portion intermediate the attaching and interlocking ends of the fastener elements are so located that they penetrate the cover portion at points in the immediate vicinity of the edge of the base portion from which the fastener elements project and are set back from the edge of said cover portion.

5. A fastener structure such as set forth in claim 3 in which the stitches penetrating the cover portion are in the form of loops penetrating the cover portion approximately in line with the edge of the base portion from which the fastener elements project, said loops passing said edge and then extending in a direction toward the ends of the fastener elements carried by the base portion and there locked in the said position.

6. In a fastener structure of the slide-operated type, the combination of a base portion, a row of fastener elements attached at their roots to an edge of said base portion, a cover portion overlying said fastener elements, means for securing the cover portion with relation to the base portion, said means including stitches holding the cover portion upon the base portion near the roots of the fastener elements and a second progression of sewing including stitches penetrating at least the cover portion at points intermediate the attaching and interlocking ends of the fastener elements and extending transversely of the individual fastener elements of the row and between adjacent fastener elements in the row.

7. In a fastener structure of the slide-operated type including a base portion and a row of fastener elements attached to an edge thereof, a cover portion overlying said fastener elements and a part at least of the base portion, means for securing the cover portion with relation to the base portion, said means including stitching comprising longitudinal thread portions positioned to cross each of the fastener elements and transverse threads portions extending in the spaces between adjacent fastener elements.

8. A fastener structure such as set forth in claim 3 in which each of the fastener elements is provided with a projection and a depression to serve as interlocking agents with corresponding depressions and projections of adjacent fastener elements of the opposite row of such elements and in which the cover portion extends outwardly beyond the edge of the base portion to such an extent as to extend substantially to the mid-points of the several inter-locking projections and depressions of the row of fastener elements.

9. A fastener structure such as set forth in claim 3 in which the stitches are inter-locking stitches, a part of which extends over and around the edge of the base portion between the fasteners and are locked in said position.

10. In a fastener structure of the slide-operated type, the combination of a base portion, a row of fastener elements attached to an edge of said base portion, a cover portion having a top side and an under side, means for securing the cover portion with relation to the base portion, said means including stitches penetrating said cover portion through its under side at points intermediate the attaching and interlocking ends of the fastener elements and between adjacent fastener elements in the row in line approximately with the edge of the base portion, a reverse fold in the cover portion extending toward the base portion and covering the said stitches.

11. In a fastener structure of the slide-operated type, the combination of a base portion, a cover portion, a row of fastener elements attaching the cover portion to the base portion, and themselves attached to said base portion, a fold in the cover portion around and over the attached ends of the fastener elements, stitches penetrating said folded-over portion of the cover at points intermediate the attaching and interlocking ends of the fastener elements and between adjacent fastener elements in the row in line approximately with the edge of the base portion and a reverse fold in the cover portion extending toward the base portion and covering the said stitches.

12. A fastener structure such as set forth in claim 3 in which an additional covering strip underlies the bottom portions of the fastener elements, said additional covering strip and the main cover portion being both secured to the base portion by stitches positioned as set forth.

13. A fastener structure such as set forth in claim 3 in which the fastener elements are individually provided with grooves positioned for the reception of threads of the stitching.

14. A fastener structure such as set forth in claim 3 in which the fastener elements are individually provided with grooves positioned for the reception of parts of the cover portion depressed by thread portions crossing the fastener elements.

15. A fastener structure such as set forth in claim 10 in which an additional covering strip underlies the bottom portions of the fastener elements, said additional covering strip and the main cover portion being both secured to the base portion by stitches positioned as set forth and each of said cover portions being folded back toward the base portion concealing stitches.

16. The combination of an article having an opening, a fastener structure of the slide-operated type attached to the edges of said opening, said fastener structure including rows of interlocking fastener elements, cover strips of harmonious structure and appearance with relation to the article, each immediately over-lying one of the rows of the inter-locking fastener elements, securing means for attaching the cover strips to the material from which the fastener elements extend and stitches penetrating the cover strips at points intermediate the attaching and inter-locking ends of the fastener elements and extending transversely of the individual elements of the rows and between adjacent fastener elements in the two rows, said strips being so positioned under the fastening influence of said stitches as to extend beyond the longitudinal central line of inter-locking of the two rows of fastener elements and adapted, when the rows are in inter-locking engagement, to cover the elements completely, the edges of the cover strips abutting against each other in said interlocking position of the fastener elements and prevented from gaping by the stitches, said stitches being positioned to hold the edge portions of the cover strips against the upper portions of the respective rows of fastener elements, and to lie in the path of sidewise movement of the individual fastener elements.

17. A fastener structure of the slide-operated type comprising a pair of fabric edge portions and rows of interlocking fastener elements attached to said edge portions and having free ends projecting outwardly therefrom, each of said fastener elements having a projecting portion extending transversely of the plane of the fabric at the underside thereof, the fastener elements of each row being configured for interlocking engagement with the fastener elements of the opposed row, a fabric covering section projecting outwardly to over-lie the upper surfaces of the fastener elements of each row and extending far enough toward the outer ends of the fastener elements so that when the rows of elements are interlocked the outer edges of such fabric sections meet and completely conceal said fastener elements, means intermediate the attaching and interlocking ends of said fastener elements to hold said fabric covering sections against the upper surfaces of said fastener elements, and a slide member arranged for engagement with the under and inner portions only of the fastener elements to effect the interlocking and opening of said fastener elements, said slide comprising an upper portion, the under inner side of which spans the covering fabric overlying the upper surfaces of the fastener elements of both rows, an inner central wedge-shaped portion arranged for cooperation with the outer free portions of the elements, and a lower portion having upstanding lateral walls arranged for cooperation with the downwardly projecting parts of the several fastener elements.

18. In a structure such as set forth in claim 3, a slide member arranged for engagement with the under and inner portions only of the fastener elements while the upper portion of the slide member is arranged to afford space for the passage through the slide member with minimum frictional contact of the cover portion and those parts of the stitches which are situated upon the surface of the cover portion.

19. In a fastener structure of the slide-operated type, the combination of a base portion, a row of fastener elements attached thereto and projecting from an edge thereof, a cover portion over-lying said fastener elements, means for securing the cover portion with relation to the base portion, said means including stitches penetrating the cover portion at points intermediate the attaching and interlocking ends of the fastener elements and extending transversely of the individual fastener elements of the row and between adjacent fastener elements in the row, a second base portion and row of fastener elements, a cover portion therefor, and means for securing said second cover portion with relation to its base portion, said means including stitches penetrating the second cover portion at points intermediate the attaching and interlocking ends of the fastener elements and extending transversely of the individual fastener elements of the second row and between the adjacent fastener elements of the second row, the two rows of fastener elements being adapted for interlocking engagement, and a slide controlling said interlocking elements having openings for the passage therethrough of the whole of the several fastener elements as well as of all those parts of the cover portions which over-lie said fastener elements.

20. In the combination set forth in claim 16, a slide controlling the interlocking of the respective rows of fastener elements, said slide having openings for the passage therethrough of the whole of the several fastener elements as well as of all those parts of the cover portions which over-lie said fastener elements.

21. In a fastener structure of the slide-operative type, the combination of a fabric base portion, a row of fastener elements attached thereto and projecting from an edge thereof in approximately the plane of the fabric base portion, a fabric cover portion having a body section extending in a plane parallel to that of the fabric base portion and overlying the fastener elements, the two fabric sections forming a fabric pocket within which lies the inner end sections of the fastener elements, and uniting means, anchored respectively in the cover portion and the base portion, said uniting means being positioned and effective at points intermediate the attaching and interlocking ends of the fastener elements to assure the maintenance of the relative position of the fabric cover portion, the fastener elements and the base portion, and to hold the fabric cover portion against the upper surfaces of said fastener elements, said uniting means being so combined with the fabric cover portion as not to destroy the fabric appearance of said cover portion.

22. In an edgewise interlocking slide fastener, a pair of base strips comprising fastener element stringers, cooperating series of fastener elements having attaching portions for securing them to adjacent edges of said base strips, thin flexible cover strips engaged by said attaching portions and folded back over the fastener elements on one side of the fastener and extending far enough that the cover strips on the opposed fastener parts meet and completely conceal the fastener elements when the fastener is closed, attaching means for holding said folded-over portions closely against the fastener elements, and an operating slider embracing both said fastener elements series and said cover strips.

23. The combination specified in claim 22 wherein said fastener element attaching portions are in the form of jaws clinched around the stringer edge, the cover strips being held between said jaws.

24. In an edgewise interlocking slide fastener, a pair of base strips comprising fastener element stringers, a cover strip fastened along one edge to an edge of each of said base strips, means forming a bead at said edge, cooperating series of fastener elements having jaw portions clamped around said beaded edges, said cover strip being folded back over the fastener elements and meeting in the longitudinal center line of the fastener when the fastener is closed, means for holding the cover strips permanently against the fastener elements, and an operating slider embracing both said fastener element series and said cover strips.

25. In a fastener structure of the slide-operated type, the combination of a base portion, a row of fastener elements attached thereto and projecting from an edge thereof, and a cover portion adjacently overlying said fastener elements, means to maintain the relative position of the cover portion, the fastener elements and the base portion, and to hold the cover portion against the upper portion of said fastener elements, said means including stitches penerating the cover portion intermediate the attaching and interlocking ends of the fastener elements and extending transversely of the individual fastener elements of the row and between adjacent fastener elements in the row, and a slide member arranged for engagement with the under and inner portions only of the fastener elements.

26. In a fastener structure of the slide-operated type, the combination of a base portion, a row of fastener elements attached thereto and projecting from an edge thereof, and a cover portion overlying said fastener elements and secured to the base portion by stitches penetrating the cover and base portions at points intermediate the attaching and interlocking ends of each fastener element and between adjacent fastener elements in a row.

27. A fastener structure such as set forth in the preceding claim in which each of the fastener elements is provided with an interlocking portion extending outwardly from the edge of the base portion and in which the cover portion extends outwardly from the edge of the base portion to such an extent as to overlie a part at least of the interlocking portions of the fastener elements.

28. In a fastener structure of the slide-operated type, the combination of a base portion, a row of fastener elements each attached at one end to said base portion and projecting from an edge thereof, and a cover portion overlying said fastener elements and secured to the base portion by a continuous line of stitching passing through the cover and base portion and including stitches longitudinally of the cover close to the attached ends of said fastener elements and stitches transverse of the cover penetrating both said base portion and said cover between adjacent fastener elements and intermediate the ends thereof.

29. A stringer unit for fastener devices of the class described comprising two mounting tapes, each consisting of thin fabric strips, a plurality of coupling elements attached to and spaced longitudinally of one edge of one of said tapes and projecting therebeyond, the other tape being mounted directly on the first named tape, said tapes being stitched together adjacent said elements, said stitching being independent of the attachment of said unit to a suitable support, a flange portion integral with the second named tape and projecting beyond the edge of the first named tape and covering part of the projecting portions of said coupling elements, and means positioned between the inner and outer edges of the coupling elements for snugly supporting said flange portion upon said elements.

30. In a fastener structure of the slide-operated type, the combination of a base portion, a row of fastener elements attached thereto and projecting from an edge thereof, said elements having surfaces disposed in a plane spaced from the base portion, and a cover portion overlying the elements in contact with said surfaces and secured to the base portion by stitches connecting the cover and base portions at points intermediate the attaching and interlocking ends of each fastener element and between adjacent fastener elements in a row.

31. A fastener structure as set forth in claim 30, in which the stitches connect the cover and base portions at points in the immediate vicinity of the edge of the base portion from which the fastener elements project.

32. A fastener structure as set forth in claim 30, in which each of the fastener elements is provided with interlocking portions and in which the cover portion extends outwardly from the edge of the base portion to such an extent as to overlie a part at least of the interlocking portions of the fastener elements.

33. A fastener structure of the slide-operated type comprising two base portions, each consisting of fabric material and provided with a reinforced section extending lengthwise thereof, cooperating series of fastener elements attached to the reinforced sections of said base portions and having free ends projecting outwardly from said base portions, the free end of each element being provided with interlocking portions, a fabric covering portion overlying the upper surfaces of the fastener elements of each series and extending far enough toward the outer ends of the fastener elements so that when the series are interlocked, the outer edges of such fabric portions meet and completely conceal said fastener elements, and means connecting each covering portion to its associated series of elements along a line extending longitudinally of the base portions and positioned between the inner and outer ends of the coupling elements.

34. In separable fasteners of the class described consisting of two stringers adapted to be coupled and uncoupled, each stringer consisting of a mounting tape with coupling elements attached to one edge portion thereof and projecting beyond said edge in spaced relation with respect to each other, a finishing and mounting strip folded upon itself to form a flange portion, said strip being mounted directly upon said tape, means inwardly of said flange portion and adjacent said elements for securing the strip to said tape, said means being independent of the attachment of said tape and strip with a suitable support, the flange portion of said strip being disposed upon one side face of the protruding portions of said coupling elements, and means positioned between the inner and outer edges of the coupling elements for retaining said flange portion in juxtaposition to said elements.

35. A stringer unit for fastener devices of the class described comprising two mounting tapes, a plurality of coupling elements attached to and spaced longitudinally of one edge of one of said tapes and projecting therebeyond, the other tape being mounted directly on the first named tape, means adjacent said elements for attaching the tapes together, said means being independent of the attachment of said unit to a suitable support, a flange portion on the second named tape formed by folding one edge of said tape upon itself and projecting beyond the edge of the first named tape and covering part of the projecting portions of said covering elements, and means positioned between the inner and outer edges of the coupling elements for holding said flange portion closely against said elements.

36. A stringer unit for fastener devices of the class described comprising two mounting tapes, each consisting of thin fabric strips, a plurality of coupling elements attached to and spaced longitudinally of one edge of one of said tapes and projecting therebeyond, the other tape being mounted directly on the first named tape, said tapes being stitched together adjacent said elements, said stitching being independent of the attachment of said unit to a suitable support, a flange portion integral with the second named tape and projecting beyond the edge of the first named tape and covering part of the projecting portions of said coupling elements and means for holding said flange portion against said elements, said means comprising extensions connected with said first and second named tapes and extending down between the coupling elements intermediate the inner and outer ends of the latter so as to extend over and around the element supporting edge of the first named tape, whereby the flange portion of the second named tape is held down against the elements.

37. In a fastener structure of the slide operated type, the combination of a base portion, a row of fastener elements attached thereto adjacent the edge thereof, and a cover overlying said fastener elements and secured to the base portion by stitches penetrating the cover and base portion at points between adjacent fastener elements and other stitches penetrating the cover and base portions close to the attached ends of said fastener elements.

38. A fastener structure of the slide-operated type comprising two base portions, each provided with a reinforced element extending lengthwise thereof, cooperating series of fastener elements having attaching portions securing them to the longitudinally extending reinforced sections of said base portions, covering portions having one edge thereof engaged under the attaching portions of the fastener elements and folded back over the fastener elements on one side of the fastener and extending far enough to the outer ends of the elements to completely conceal the fastener elements when the fastener is closed and attaching means for holding said folded over portions down against the fastener elements.

39. In a separable fastener of the slide-operated type comprising two stringers each adapted to be coupled and uncoupled, each stringer including a row of fastener elements having attaching portions in the form of jaws engaging a base portion, a covering portion and a strengthening member, said base portion being adapted to be attached to a suitable support and said covering portion being folded back over the fastener elements on one side of the stringer and extending far enough to the outer ends of the elements to completely conceal the fastener elements when the fastener is closed and attaching means for holding said folded over covering portion down against the fastener elements.

40. In a separable fastener of the slide-operated type comprising two stringers each adapted to be coupled and uncoupled, each stringer including a row of fastener elements having attaching portions in the form of jaws engaging a base portion and a covering portion, said base portion being adapted to be attached to a suitable support and said covering portion being folded over the fastener elements on one side of the stringer and extending far enough to the outer ends of the fastener elements to completely conceal the elements when the fastener is closed and attaching means for holding said folded over covering portion down against the fastener elements.

41. A separable fastener such as is defined in claim 40, in which the attaching means for holding the covering portion against the fastener elements comprises stitches which penetrate said covering portion at points intermediate the attaching and outer ends of the elements.

42. A fastener structure of the slide-operated type comprising two stringers each adapted to be coupled and uncoupled, each stringer including a base portion adapted to be attached to a suitable support and provided with a longitudinally extending reinforced section, a row of fastener elements projecting outwardly from said base section, the projecting ends of said elements being provided with interlocking portions, a covering portion overlying the upper surfaces of the row of elements and extending far enough toward the projecting ends of the fastener elements so that when the row of elements is in interlocked engagement with the row of elements on the other stringer, the outer edge of such covering portion meets with the outer edge of the covering portion on the other stringer, whereby the elements are completely concealed, said fastener elements each having attaching portions in the form of jaws engaged with the longitudinally extending reinforced section, whereby the base portion and covering portion are clinched together.

DAVID SILBERMAN.